United States Patent Office
3,240,771
Patented Mar. 15, 1966

3,240,771
RECOVERY AND STABILIZATION OF LOW-PRESSURE POLYOLEFINES
Manfred Blazejak, Dusseldorf, and Karl Nützel, Leverkusen, Germany, assignors to Farbenfabriken Bayer Aktiengesellschaft, Leverkusen, Germany, a German corporation
No Drawing. Filed May 29, 1962, Ser. No. 198,436
Claims priority, application Germany, June 13, 1961, F 34,154
14 Claims. (Cl. 260—88.2)

This invention relates to a novel process for recovery of low-pressure polyolefines from solutions and dispersions thereof, simultaneously stabilizing said low-pressure polyolefines.

The method of this invention is applicable to the recovery and stabilization of α-olefine polymers from the solvents and dispersing agents used in polymerization of said α-olefines, the polymers of which can be homopolymers or copolymers of one or more α-olefines.

The low-pressure polymerization of ethylene or comparable polymerization of α-monoolefines as well as the copolymerization of ethylene and α-monoolefines is mainly carried out in solvents or dispersing agents which are free from moisture and oxygen, such as hexane, cyclohexane, benzene or chlorobenzene. Combinations of metals, hydrides or organic compounds of alkali metal alkaline earth metal or earth metals with heavy metal compounds of the sub-group IV to VI of the Periodic System are used as polymerization catalysts in these cases.

The polymers are usually obtained as suspensions which are dark in color, when using these catalysts. Before the solvent is separated, it is advisable to destroy the catalyst and to convert it into a soluble form, which can be washed out without hydrolysis. An almost complete removal of the catalyst is necessary in order to obtain good mechanical properties.

Numerous additives have already been proposed for the removal of the catalyst, such as alcohols, water, alkalis, mineral acids, organic acids, amines, ethers and other additives. It is, however, necessary after removal of the catalyst to add stabilizers to the polyolefines. It is thus not possible to avoid a separate working step.

It has now been found that low-pressure polyethylenes and polymers or copolymers of α-monoolefines prepared by analogous processes can be freed surprisingly well from the aforementioned catalysts by using mercaptans which are able to form stable complexes with metals, such an amount of mercaptan simultaneously remaining in the polymer that a subsequent stabilisation step is superfluous.

By mercaptans which are able to form stable complexes with the metals of the catalyst systems being used are to be understood those which remain undecomposed in the polymerization medium at temperatures between approximately 0° C. and approximately 100° C. over periods of the order of about 2 hours and longer. Aliphatic mercaptans, more especially those of saturated nature, such as butyl mercaptan, dodecyl mercaptan etc. are to be considered for this purpose. According to a preferred embodiment of the present invention, 1,2-thioglycols are used, more especially those which conform to the general formula

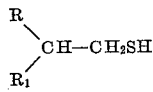

wherein R is a member of the group consisting of hydrogen, the hydroxy group and the mercapto group, and $R_1$ is selected from the group consisting of hydrogen, an alkyl group, an alkoxy group, an alkylmercapto group, an oxalkoxy group, the phenyl group, the benzyl group and the naphthyl group, the amount of said mercaptan being about twice to five times of the amount of the catalyst employed; precipitating said polymer and thereafter separating the precipitated polymer from the liquid medium.

Examples of such compounds are the following mercaptans: ethylmercaptan, propylmercaptan, butylmercaptan, nonylmercaptan, dodecylmercaptan, mono-thio-ethylene glycol, 2-hydroxypropylmercaptan, 2-hydroxybutyl-mercaptan, 2-phenyl-2-oxyethylmercaptan, ethanedithiol-(1,2), propanedithiol-(1,3), 2-cylcohexyl-2-oxyethylmercaptan, 2-naphthyl-2-oxyethylmercaptan and 2-benzyl-2-oxyethylmercaptan.

Mixtures of these thioalcohols with one another and with other known stabilizers, such as metal stearates, which prevent discoloration when working by injection moulding, and amines, which serve for the stabilisation against the action of ultraviolet may also be used.

The process of the present invention can be used in connection with various solutions or dispersions of polymers or copolymers of ethylene or α-monoolefines, which are produced with the use of metal-containing complex catalysts, more especially catalysts based on combinations of metals, hydrides or organic compounds of the main groups I–III of the Periodic System with heavy metal compounds of sub-groups IV–VI of the Periodic System or types of catalysts which are based on monovalent magnesium compounds. Of particular interest in this connection are polymers of homopolymers or copolymers of ethylene, propylene, 1-butene or like α-olefines. The process is applicable both to dispersions of such polymers and, in the case of copolymers, to solutions of such copolymers.

The working-up process according to the present invention can be carried out continuously or discontinuously. The suspension of for example a crude low-pressure polyolefine or of the solution of a copolymer of α-monoolefines which forms is stirred at temperatures which may vary within wide limits but which are preferably between 10 and 100° C., with the mercaptans to be used according to the invention with exclusion of oxygen and water.

The quantity of the mercaptan used depends primarily on the quantity of the catalyst employed and is advantageously about twice to five times the quantity of catalyst which is employed. In particular cases lesser or greater quantities may be used. If the quantity of the mercaptan to be used is related to the quantity of dispersing agent or solvent, quantities advantageously between the limits of 0.1 and 5% are employed. Quantities larger than 5% can in principle be used without any disadvantage, although the use of such quantities is not generally of economic interest.

After adding the mercaptan, colored complexes are usually formed, which can be washed out, without hydrolysis, with acidified water or with methanol or methanol-water mixtures. A quantity of about 0.1 to 0.3% of the thioalcohol, related to the polymer, remains in the polymer after this washing step. This quantity of thioalcohol or mercaptan which remains prevents a degradation by oxidation of the polymer and an undesired discoloration of the products during subsequent industrial processing.

The suspension or solution of the polymer freed from the catalyst and thioalcohol complex is then subjected to a steam treatment in order to remove the organic solvent or suspension agent actually employed.

The polymer, in powder form is then dried in vacuo at temperatures which are advantageously between 60 and 80° C. The olefines obtained according to this process are pure white powders, which show an ash content of generally below 0.1%.

Although thioalcohols frequently have an unpleasant odour, it is surprisingly found that the polymers are odourless, despite the relatively high proportion of thioalcohol. This process is particularly suitable for the working-up of polymers of α-monoolefines, which have been polymerised with a combination of magnesium monohalides with heavy metal compounds of sub-groups IV–VI of the Periodic System, for example according to the process indicated in French Patent 1,220,307. In this case, complexes of thioalcohols and catalyst are formed which can easily be washed out.

By means of the process of the invention, it has become possible to effect the removal of the catalysts from α-monoolefine polymers in a simple manner by means of compounds which are available industrially. It is surprising that the use of mercaptans, in particular the use of thioglycols, not only results in no disadvantageous influence on the polymer, such as an unpleasant odour, discoloration, etc., but simultaneously renders possible a stabilization of the polymers against degradation by oxidation under the influence of heat. A circumstance which is of particular importance is that it is possible by the present process to effect the stabilization of the polymers simultaneously with the destruction or removal of the catalyst. By this means, the danger of oxidation by atmospheric oxygen during working-up is practically excluded. It is also possible for this reason to work in considerably simplified apparatus, more especially because, for example, the incorporation of a stabilizer under an inert gas atmosphere is dispensed with.

The parts mentioned in the following examples are parts by weight unless otherwise indicated.

*Example 1*

By polymerisation of ethylene with diethyl aluminum chloride and titanium tetrachloride as catalyst in n-heptane, a suspension of 200 parts of polyethylene in 1000 parts of n-heptane was prepared. 30 parts of monothioethylene glycol are added and the mixture is stirred under nitrogen for 60 minutes at 60° C. The brown-colored polymer initially formed thus becomes white, and the catalyst enters into solution to give an orange-red color. 50 parts of 10 percent aqueous acetic acid are now added to the reaction mixture and thoroughly stirred therewith for 30 minutes. The polymerization catalyst enters the aqueous phase, which is then carefully separated out. Washing is then carried out 3 times with salt-free water, using 300 parts thereof on each occasion. The polymer is filtered off, treated with steam and then dried in vacuo at 60° C. A pure white powder is obtained which has an ash content of <0.1 percent. The sulfur content of the polymer corresponds to 0.4 percent of thioalcohol. Moulded plates were produced from a sample, which plates showed an improved stability with respect to degradation by oxidation in aging tests at 120° C.

*Example 2*

1000 parts of a suspension of polyethylene in n-heptane (polymer proportion 15 percent), which has been prepared with magnesium-I-bromide and titanium tetrachloride as catalyst, are mixed with 40 parts of 2-hydroxypropyl mercaptan and stirred for 60 minutes at 70° C. A complex analogous to that described in Example 1 is formed. After cooling the reaction mixture, 100 parts of a 5 percent aqueous oxalic acid solution are added and stirring is continued for 30 minutes. The aqueous phase is then separated and the polymer is washed several times while stirring with salt-free water using 300 parts thereof on each occasion. The polymer is then filtered off from the dispersing agent, treated with steam and dried in vacuo at 60° C. A white powder is obtained which has an ash content of 0.09 percent. The sulfur content of the polymer corresponds to 0.3 percent of thioalcohol. Moulded plates likewise showed a good stability with respect to degradation by oxidation.

*Example 3*

1000 parts of a suspension of polyethylene in n-heptane (polymer proportion 15 percent), which was prepared with magnesium-I-bromide and titanium tetrachloride as catalyst, are mixed with 30 parts of mono-thioethylene glycol and stirred for 60 minutes at 70° C. After cooling the reaction mixture, 50 parts of methanol are added and stirring is continued for another 30 minutes. The complex compound of catalyst and thioalcohol passes over into the methanolic phase. This is extracted and the polymer is further washed for 4 to 6 times while stirring, using 300 ml. of methanol on each occasion. The polymer is thereafter removed by centrifuging and is dried in vacuo at 60° C. A pure white powder is obtained with an ash content of 0.1 percent. The sulfur content of the polymer corresponds to 0.3 percent of thioalcohol. Moulded plates showed a good stability against degradation by oxidation in the degradation tests at 120° C.

*Example 4*

Using magnesium-I-bromide and titanium trichloride as catalyst, a suspension of 50 percent by weight of polypropylene in 500 parts of n-heptane was prepared. After completing polymerisation, 20 parts of monothio-ethylene glycol were added and the mixture stirred for 60 minutes at 80° C. After cooling the reaction mixture, the complex comprising catalyst and thioalcohol was dissolved while stirring in 50 percent by weight methanol. The methanolic phase was extracted and the polymer was washed another 4 times with methanol and while stirring, using 300 parts of methanol on each occasion. The polymer was filtered off, extracted with n-heptane, thereafter treated with steam and dried at 60° C in vacuo. A white polymer is obtained with an ash content of 0.1 percent. The sulfur content corresponded to 0.5 percent of thioalcohol.

*Example 5*

Using magnesium-I-bromide and vanadium oxychloride as catalyst, 100 parts of an ethylene-propylene copolymer were prepared in 800 parts of n-heptane. After completing the polymerization, 40 parts of monthioethylene glycol are added and stirring is carried out for 60 minutes at 60° C. The catalyst enters into solution with a bluish-green color. 300 parts of methanol are then added and stirring is continued for another 30 minutes. The precipitated copolymer is then worked thoroughly in a kneader several times with the suitable quantity of methanol and the residual quantities of catalyst are thus removed. The polymer is then dried at room temperature in vacuo. The ash content is 0.1 percent. The sulfur content was not determined in this case.

We claim:

1. A process for recovering in stabilized form a low-pressure polymer of an alpha-olefin from a reaction mixture containing an organic liquid reaction medium, a low-pressure polymer of an alpha-olefin and metal-containing complex polymerization catalyst used for preparing said low-pressure polymer which comprises introducing into said reaction medium liquid 1,2-monothioglycol of the formula

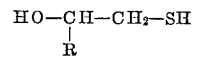

wherein R is selected from the group consisting of hydrogen, an alkyl group, an alkoxy group, an alkylmercapto group, an oxalkoxy group, the phenyl group, the benzyl group and the naphthyl group, the amount of said 1,2-monothioglycol being about two to five times the amount of catalyst employed, thereby forming a hydrocarbon-soluble complex of the polymerization catalyst and the 1,2-monothioglycol, removing said complex from the reaction mixture, and thereafter recovering the polymer from the reaction medium, said recovered polymer containing a stabilizing amount of the aforesaid 1,2-monothioglycol.

2. The process of claim 1 wherein the organic liquid reaction medium is selected from the group consisting of an organic solvent and an organic dispersing agent.

3. The process of claim 1 wherein the 1,2-monothioglycol is monothioethylene glycol.

4. The process of claim 1 wherein the 1,2-monothioglycol is 2-hydroxy-propylmercaptan.

5. The process of claim 1 wherein the polymer is polyethylene.

6. The process of claim 1 wherein the polymer is a copolymer of ethylene and propylene.

7. The process of claim 1 wherein the catalyst is the reaction product of (a) a compound of a metal of subgroups IV–VI of the Periodic System and (b) a member selected from the group consisting of monovalent magnesium, a metal selected from groups from I–III of the Periodic Table, a hydride of a metal of Groups I–III of the meriodic Table, and an organo-metal compound of a metal of Groups I–III of the Periodic Table.

8. A process for the recovery of a stabilized low-pressure polyethylene which has been prepared by the polymerization of ethylene in the presence of a catalyst prepared from titanium tetrachloride and an alkyl aluminum compound in an organic liquid reaction medium, which comprises introducing into the foregoing reaction medium liquid monothioethylene glycol in an amount of about two to five times the amount of catalyst employed, thereby forming a hydrocarbon-soluble complex of the catalyst and the monothioethylene glycol, which complex dissolves in the organic reaction medium, washing the latter out of the system, separating the polyethylene from the reaction medium, washing it, and thus recovering low-pressure polyethylene containing a stabilizing amount of monothioethylene glycol.

9. The process of claim 8 wherein the organic solution of catalyst complex is stirred with an aqueous solution and the catalyst is thereby transferred into the aqueous phase, and the latter is separated from the organic phase.

10. The process of claim 8 wherein the catalyst is prepared from TiCl4 and diethyl aluminum chloride.

11. A process for the recovery of a stabilized low-pressure polyethylene which has been prepared by the polymerization of ethylene in the presence of a catalyst prepared from a titanium halide and magnesium-I-bromide in an organic liquid reaction medium, which process comprises introducing into the foregoing reaction medium liquid 2-hydroxy-propylmercaptan in an amount of about two to five times the amount of catalyst employed, thereby forming a hydrocarbon-soluble complex of the catalyst and the 2-hydroxy-propylmercaptan, which complex dissolves in the organic reaction medium, washing the latter out of the system, separating the polyethylene from the reaction medium, washing it, and thus recovering the low-pressure polyethylene containing a stabilizing amount of 2-hydroxy-propylmercaptan.

12. A process for the recovery of a stabilized low-pressure polyethylene which has been prepared by the polymerization of ethylene in the presence of a catalyst prepared from a titanium halide and magnesium-I-bromide in an organic liquid reaction medium, which process comprises introducing into the foregoing reaction medium liquid monothioethylene glycol in an amount of about two to five times the amount of catalyst employed, thereby forming a hydrocarbon-soluble complex of the catalyst and the monothioethylene glycol, which complex dissolves in the organic reaction medium, washing the latter out of the system, separating the polyethylene from the reaction medium, washing it, and thus recovering the low-pressure polyethylene containing a stabilizing amount of monothioethylene glycol.

13. A process for the recovery of a stabilized low-pressure polypropylene which has been prepared by the polymerization of propylene in the presence of a catalyst prepared from titanium trichloride and magnesium-I-bromide in an organic liquid reaction medium, which process comprises introducing into the foregoing reaction medium liquid monothioethylene glycol in an amount of about two to five times the amount of catalyst employed, thereby forming a hydrocarbon-soluble complex of the catalyst and the monothioethylene glycol, which complex dissolves in the organic reaction medium, extracting the resulting solution from the system, and recovering low-pressure polypropylene containing a stabilizing amount of monothioethylene glycol.

14. A process for the recovery of a stabilized low-pressure ethylene-propylene copolymer which has been prepared by the copolymerization of ethylene and propylene in the presence of a catalyst prepared from magnesium-I-bromide and vanadium-oxychloride in an organic liquid reaction medium, which process comprises introducing into the foregoing reaction medium liquid monothioethylene glycol in an amount of about two to five times the amount of catalyst employed, thereby forming a hydrocarbon-soluble complex of the catalyst and the monothioethylene glycol, which complex dissolves in the organic reaction medium, separating the latter from the system and recovering a precipitated low-pressure ethylene-propylene copolymer containing a stabilizing amount of monothioethylene glycol.

References Cited by the Examiner

UNITED STATES PATENTS 2,996,459  8/1961  Andersen et al. _____ 260—88.2

FOREIGN PATENTS 827,661  2/1960  Great Britain.
832,996  4/1960  Great Britain.
1,162,488  4/1958  France.

JOSEPH L. SCHOFER, *Primary Examiner.*